United States Patent [19]
Slife et al.

[11] Patent Number: 5,151,935
[45] Date of Patent: Sep. 29, 1992

[54] PROGRAMMABLE UNIVERSAL SIGNALING CIRCUIT FOR A TELEPHONE NETWORK

[75] Inventors: Jimmy D. Slife, Aurora; David Farrell, Lafayette, both of Colo.

[73] Assignee: XEL Communications, Inc., Aurora, Colo.

[21] Appl. No.: 609,083

[22] Filed: Nov. 2, 1990

Related U.S. Application Data

[63] Continuation-in-part of Ser. No. 453,814, Dec. 20, 1989, abandoned.

[51] Int. Cl.[5] .......................... H04J 3/12; H04M 7/10
[52] U.S. Cl. ..................................... 379/240; 379/201; 379/269; 370/58.3; 370/110.1
[58] Field of Search ............... 379/229, 230, 234, 235, 379/240, 201, 269; 370/62, 56, 58.3, 58.2, 110.1

[56] References Cited

U.S. PATENT DOCUMENTS

| | | | |
|---|---|---|---|
| 4,247,740 | 1/1981 | Auderson et al. | 379/124 |
| 4,307,461 | 12/1981 | Brickman et al. | 379/269 X |
| 4,636,584 | 1/1987 | Bimkerd et al. | 379/240 |
| 4,734,935 | 3/1988 | Toudo | 379/236 |

*Primary Examiner*—Thomas W. Brown
*Attorney, Agent, or Firm*—Dorr, Carson, Sloan & Peterson

[57] ABSTRACT

A programmable universal signaling circuit for use in a universal channeling unit of a telephone network. The programmable universal signaling circuit uses a line converter and decoder circuit which under control of a microprocessor generates a unique set of configuration signals for configuring the universal signaling circuit into one of a plurality of standard signaling telephone circuits. The universal signaling circuit can be reconfigured either at the location of the universal channel unit or remotely.

11 Claims, 6 Drawing Sheets

PROGRAMMABLE UNIVERSAL SIGNALING CIRCUIT FOR A TELEPHONE NETWORK

This is a continuation-in-part of copending application Ser. No. 07/453,814, filed on Dec. 20, 1989, now abandoned.

BACKGROUND OF THE INVENTION

1. Field of the Invention

This invention relates to special service signaling applications within a telephone network such as Foreign Exchange Subscriber (FXS), Foreign Exchange Office (FXO), Private Line Automatic Ringdown (PLAR), Foreign Exchange Ringdown (FXRD), E & M Modes 1-5, Dial Pulse Originating and Terminating (DPO, DPT), Duplex Signaling (DX), Pulse Link Repeater (PLR), Tandem Signaling (TDM) and Reverse Battery Signaling and, in particular, this invention relates to a programmable universal telephony signaling circuit that is capable of providing all special service signaling.

2. Discussion of the Prior Art

Historically, special service signaling circuits have been designed and utilized in telephony networks to provide unique signaling requirements. Each circuit was separately designed and functioned uniquely within the telephone network. The use of separate circuits, however, has created quite a burden on telephone companies who have had to stock an assortment of transmission and signaling printed circuit (PC) boards with each PC board carrying a different circuit. This is costly to operating companies in maintaining such an extensive inventory and in providing the necessary personnel to maintain the circuits and to install them in the telephone network.

One prior art approach to reduce this extensive inventory of special service circuits was to combine several related signaling applications into one board and to use switches actually located on the PC board which could be selectively activated by maintenance personnel and installers to reconfigure the PC board into one of several formats. While this somewhat aided in the inventory problem, it introduced a new concern. The manual setting of such switches introduced the problem of wrong settings which created additional overhead and maintenance costs to the telephone company.

A need exists, therefore, for a universal signaling circuit which permits a single unit to operate in one of a number of conventional signaling types and modes for fulfilling the special service signaling applications within the telephone network. Such a universal signaling circuit would eliminate the maintenance of a costly inventory since only one circuit is stocked and maintained. Such a universal signaling circuit should also be designed to eliminate the manual setting of switches and should have the ability to be configured either at the point of installation or remotely. Finally, a need exists for a universal signaling circuit which can be remotely reconfigured to function as a different special signaling circuit should the need arise.

3. Solution to the Problem

The present invention sets forth a programmable universal signaling circuit for handling special service signaling applications within a telephone network. The circuit is capable of providing at least thirty-two types of conventional telephone network special service signaling and, under the teachings of the present invention, can be adapted to provide new and other signaling features more or less than thirty-two. The universal signaling circuit of the present invention is designed to be under microprocessor control which can be programmed at the point of installation after installation, or reconfigured at a remote location at a later date. While the cost per PC board of the present invention is greater than the cost for individual prior art special service signaling PC boards, substantial savings are obtained. Because only one circuit design is utilized, only that circuit design needs to be stockpiled in inventory and maintained. This substantially reduces inventory, maintenance, and training costs. The use of a programmable universal signaling circuit also eliminates manual setting of switches, manual reading of the different types of circuit boards (since only one is used), and more trouble-free installation. Finally, because of the programmable characteristics of the universal signaling circuit of the present invention, once installed, the circuit can be reconfigured to provide a different special service signaling application from a remote location such as found in a central office.

SUMMARY OF THE INVENTION

The programmable universal signaling circuit of the present invention is used in a universal channel unit of a telephone network. Conventional A, B, E, M, SB, and SG telephone network signaling paths exist within the universal channel unit as well as microprocessor and a PCM interface which is connected to a PCM bus.

The programmable universal signaling circuit of the present invention uses a line converter and decoder circuit which is connected to the microprocessor and which receives data from the microprocessor for generating a unique set of configuration signals corresponding to the received data. The microprocessor contains unique data corresponding to all of the special signaling circuits that can be emulated by the universal signaling circuit of the present invention. The appropriate data for a desired special signaling circuit is delivered to the line converter and decoder circuit which in turn generates a unique set of configuration signals for configuring the universal signaling circuit. Hence, under the teachings of the present invention, the microprocessor can be directed, at any time, over the PCM bus to reconfigure the universal signaling circuit into a different special services circuit.

The universal signaling circuit of the present invention also includes grouping of loop circuits which are connected to the line converter and decoder circuit, to the microprocessor, and to the A and B signaling paths. The loop circuits are responsive to a first portion of the unique set of configuration signals from the line converter and decoder circuit for selectively configuring the loop circuits into a desired special signaling circuit. The loop circuits also contain a sensor for sensing loop current or voltage from the A and B signaling paths and for delivering that information back to the microprocessor. The loop sensor can be selectively adjusted with signals from the first portion of the unique set of configuration signals.

The programmable universal signaling circuit of the present invention also includes a plurality of E & M circuits which are connected to the line converter and decoder circuit, to the microprocessor, and to the E, M, SG, and SB signaling paths for selectively configuring the E & M circuits into a desired E & M special signaling circuit. The E & M circuits also contain current sensors for the E & M signaling paths and the E & M current sensors are capable of delivering information to the microprocessor.

GENERAL DESCRIPTION

Figure 1:
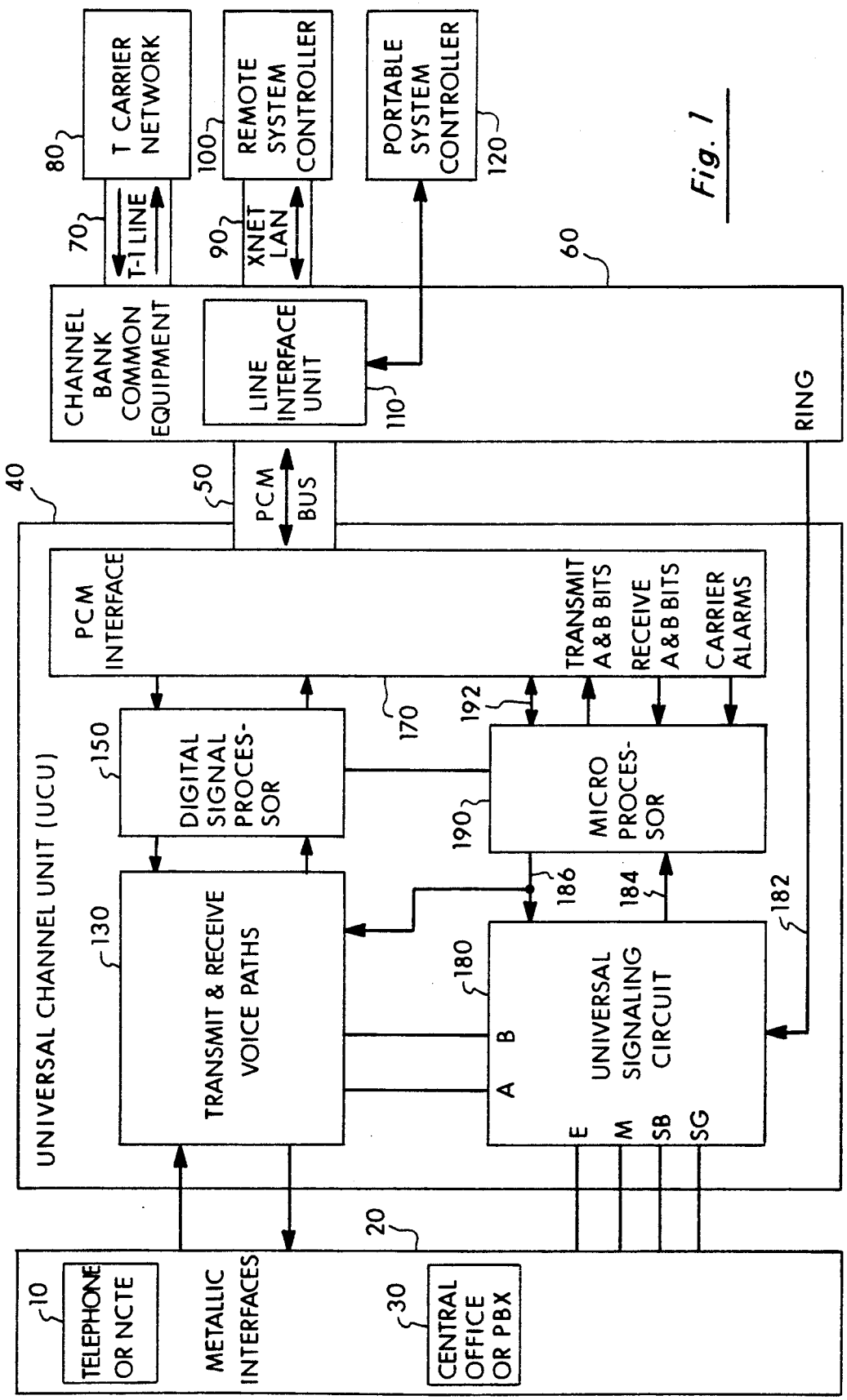
FIG. 1 sets forth a block diagram illustrating the installation of the Universal Signaling Circuit of the present invention in a telephone network.

FIG. 1 sets forth a general representation of a telephone network. A telephone or other Network Communication Terminating Equipment (NTCE) 10 may be connected to a standard metallic interface 20. Likewise, a central office or private branch exchange (PBX) 30 may also be connected to the standard metallic interface 20. The metallic interface 20 is connected to a channel bank, not shown, which comprises a number of universal channel units (UCUs) 40 such as 24 to 48.

Each universal channel unit 40 in turn is connected over a PCM bus 50 with Channel Bank Common Equipment (CBCE) 60. The CBCE in turn is interconnected over the standard T-1 line 70 with a T Carrier Network 80 and the XNET LAN 90 to a remote system controller 100. The PCM bus 50 also interconnects with a Line Interface Unit 110 located in the Channel Bank Common Equipment 60 which may be interconnected locally with a portable system controller 120. The Remote System Controller and the Portable System Controller 120 may be, for example, conventional personal computers.

Each universal channel unit 40 of the present invention has conventional transmit and receive voice paths 130. These are conventionally interconnected to the metallic interface as shown. The transmit and receive voice paths 130 are interconnected to a digital signal processor 150 which in turn is interconnected to the PCM interface 170 which directly accesses the PCM bus 50.

The universal signaling circuit 180 of the present invention is interconnected as shown. The E, M, SB, and SG leads are connected to the metallic interface 20 in a conventional fashion. The A and B signaling leads are connected into the transmit and receive voice paths 130. The universal signaling circuit receives the ringing signal over line 182 from the channel bank common equipment. The universal signaling circuit 180 delivers sensed voltage and current signals over leads 184 to the microprocessor 190. Finally, the universal signaling circuit 180 is interconnected over lines 186 to the microprocessor 190 and to the transmit and receive voice paths 130.

Microprocessor 190 is further connected to the PCM interface 170 to transmit the A and B bits, to receive the A and B bits, and to receive carrier alarms. The microprocessor 190 is also connected over bus 192 to the PCM interface 170 for data transmission.

The programmable universal signaling circuit 180 under control of the microprocessor 190 enables the provision of a universal channel unit 40. Hence, in a channel bank containing a number of channel units such as 24 to 48, under the teachings of the present invention, each channel unit is the same since each contains the universal signaling circuit 180 of the present invention. In prior approaches, each channel unit was different dependent upon the specific signal circuit utilized.

Upon installation of the universal signaling circuit of the present invention, the installer by using the portable system controller 120 can selectively access the microprocessor 190 through the line interface unit 110 over the PCM bus 50, through the PCM interface 170, over bus 192 to directly program the microprocessor 190. When properly programmed, the microprocessor 190 configures the universal signaling circuit 180 to produce the desired specific signals which, in the preferred embodiment, could comprise any one of about thirty different circuits. It is to be expressly understood that the programmable universal signaling circuit of the present invention could be designed for any suitable number of circuits.

After installation, the remote system controller 100 can be utilized by a person located, for example, in a central office to directly access the microprocessor 190 over the XNET LAN 90, through the channel bank common equipment 60, over the PCM bus 50, through the PCM interface 170, over lines 192. With such access, the configuration of the universal signaling circuit 180 can be selectively changed at any time from the remote location. This substantially eliminates manual overhead installation costs.

In Table I, the following abbreviations are used throughout the remainder of the specification.

TABLE 1

| Abbreviations Defined | |
|---|---|
| Telephony Terms: | |
| 2W | Two-Wire |
| 4W | Four-Wire |
| OFH | Off-Hook |
| ONH | On-Hook |
| CO | Central Office |
| PBX or PABX | Private Branch Exchange or Private Automatic Branch Exchange |
| NCTE | Network Communication Terminating Equipment |
| The Six Primary Signaling Lines: | |
| 1. A | A signaling lead - Normally providing a ground connection to Tip |
| 1. Tip | Tip Signaling Lead - Normally thought of as a ground connection |
| 2. B | B signaling lead - Normally providing a battery connection to Ring |
| 2. Ring | Ring Signaling Lead - Normally thought of as a battery connection |
| 3. E | Ear Lead in E&M Signaling |
| 4. M | Mouth Lead in E&M Signaling |
| 5. SG | Signal Ground Lead in E&M Signaling |
| 6. SB | Signal Battery Lead in E&M Signaling |
| Common Prefixes and Suffixes: | |
| TO | Transmission Only (no Signaling) |
| ETO | Equalization and Transmission Only (no Signaling) |
| GT | Gain Transfer |
| LS | Loop Start Signaling Protocol |
| GS | Ground Start Signaling Protocol |
| In-Band (in the voice band) Signaling Mode: | |
| SF | Single Frequency (2600 Hz), In-Band Signaling |
| E&M Signaling Modes: | |
| PLR | Pulse Link Repeater (e.g. PLR-1, PLR-2, PLR-3) |
| E&M | Ear and Mouth Signaling (e.g. E&M-1, E&M-2, |

TABLE 1-continued

| Abbreviations Defined | |
|---|---|
| | E&M-3) |
| TDM | Tandem Signaling |
| | Loop Signaling Modes: |
| LSFXS | Loop Start Foreign Exchange - Station Side |
| GSFXS | Ground Start Foreign Exchange - Station Side |
| LSFXO | Loop Start Foreign Exchange - Office Side |
| GSFXO | Ground Start Foreign Exchange - Office Side |
| PLAR | Private Line Automatic Ring Down |
| FX/RD | Foreign Exchange Ring Down Signaling Mode |
| DX | Duplex Signaling |
| DXN | Duplex Signaling - Normal Battery |
| DXR | Duplex Signaling - Reverse Battery |
| DPO | Dial Pulse Originate Signaling |
| DPT | Dial Pulse Terminate Signaling |
| | T-1 Signaling Leads: |
| Ra | Receive A Channel, usually for On-Hook/Off-Hook |
| Rb | Receive B Channel, usually for ringing |
| Ta | Transmit A Channel, usually for On-Hook/Off-Hook |
| Tb | Transmit B Channel, usually for ringing |
| | Other terms: |
| R Det | Ring Detect |
| Batt | Battery Voltage, usually −48 vdc |
| Gnd | Ground |
| RngGnd | Ring Lead Ground |
| BSense | Battery connection thru 3KΩ sense resistor |
| GSense | Ground connection thru 3KΩ sense resistor |
| Hz | Hertz (cycles per second) |
| Batt-CL | Battery Source thru 50 ma current limiter |
| SW | Switch |
| Vrms | Volts, root-mean-square. Measure of AC voltage |
| ma or mA | milli Ampheres of electrical current |

DETAILED SPECIFICATION

Figure 2:
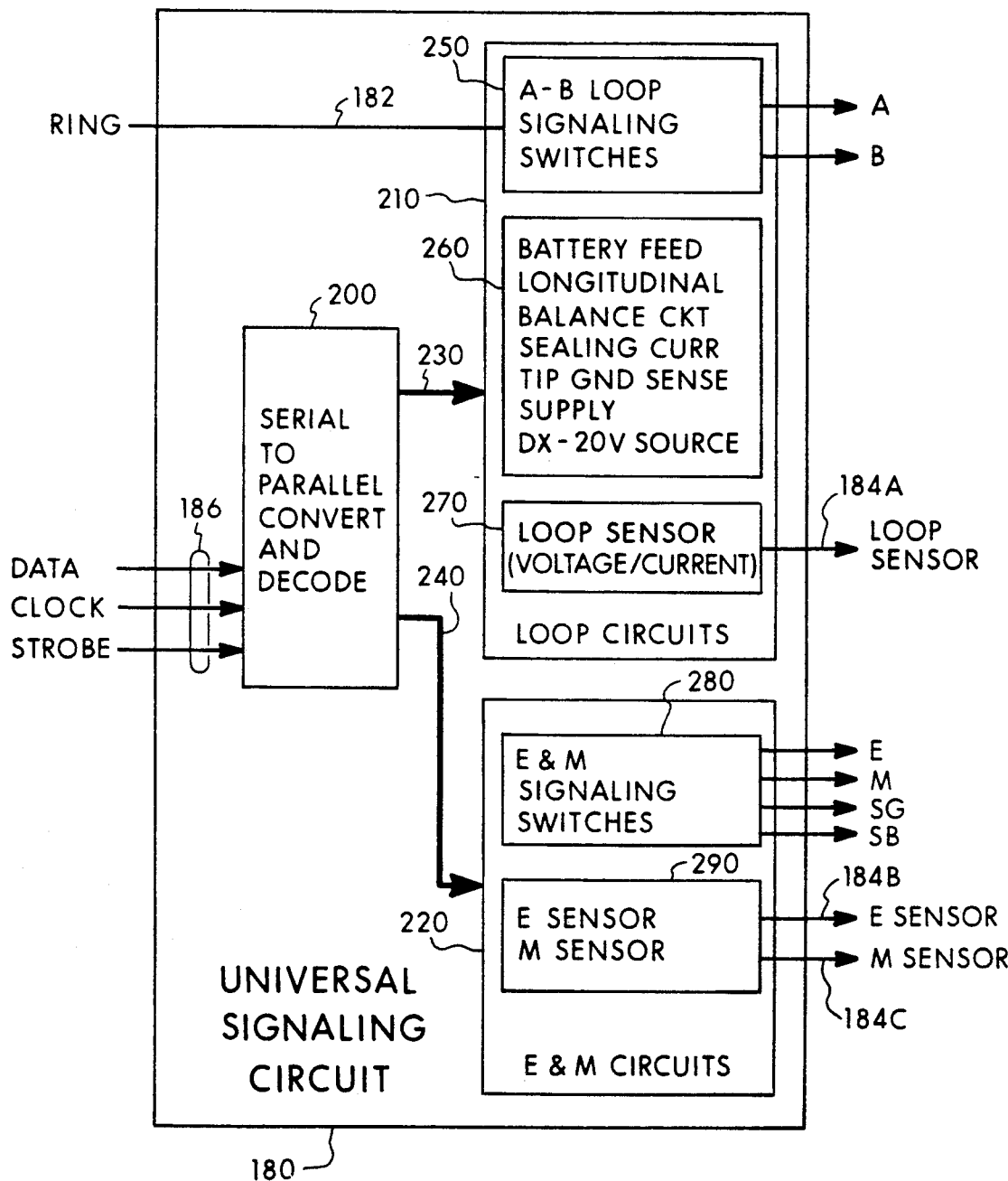
FIG. 2 is a block diagram of the Universal Signaling Circuit of the present invention.

The details of the universal signaling circuit 180 of the present invention is set forth in FIG. 2. In FIG. 2, a serial to parallel convert and decode circuit 200 is interconnected with the loop circuits 210 and with the E & M circuits 220. The serial to parallel convert and decode circuit 200 receives data, clock, and strobe signals over lines 186 from the microprocessor 190. The serial to parallel convert and decode circuit 200 is further interconnected over lines 230 to the loop circuits 210 and over lines 240 to the E & M circuits 220. The loop circuits 210 provide the A and B signaling path outputs to the transmit and receive voice paths 130 and a loop sensor signal 184 to the microprocessor 190. The E & M circuits 220 provide the E, M, SG, and SB signaling path outputs to the metallic interface 20 and the E sensor 184b and the M sensor 184c signals to the microprocessor 190.

As shown in FIG. 2, the loop circuits 210 are functionally comprised of the A-B loop signaling switches 250, a variety of conventional functions 260 are provided such as battery feed, longitudinal balance circuit, sealing current, tip ground sense, supply DX-20 volt source, and the loop sensor function 270. Likewise, the E & M circuits 220 provide the conventional E & M signaling switch functions 280 and the E sensor and the M sensor 290.

From an operational point of view, data can be clocked into the serial to parallel convert and decode circuit 200 over lines 186 according to the clock signals from the microprocessor 190. Once the data is fully entered, it is converted, decoded and then strobed by the strobe signal to the loop circuits 210 and the E & M circuits 220. The circuit 200 generates a unique set of configuration signals corresponding to the received data. A first portion of the unique set of signals is delivered over lines 230 to configure the loop circuits 210 and a second portion is delivered over line 240 to configure the E & M circuits. In at least one instance both circuits 210 and 220 are configured. Hence, circuit 200 configures the universal signaling circuit 180 of the present invention into the proper design to achieve the desired signaling outputs as dictated by the data received from the microprocessor.

In Table II, set forth below, the signaling lead connections versus the mode and state are set forth. In other words, the appropriate data is delivered from the microprocessor 190 to the serial to parallel convert decode circuit 200 which in turn configures the loop circuits 210 and/or the E & M circuits 220 into the proper mode for operation as defined in Table III. Thirty-four modes are defined.

TABLE II

| | Signaling Lead Connections versus Mode and State | | | | | |
|---|---|---|---|---|---|---|
| | Mode/State | | | | | |
| | A Lead | B Lead | E Lead | M Lead | SB Lead | SG Lead |
| 2W-Disconnect (Safe) | Open | Open | Open | Open | Open | Open |
| 4W-Disconnect (Safe) | Open | Open | Open | Open | Open | Open |
| 2W-FX/RD and PLAR1&2 | Gnd | Batt | Open | Open | Open | Open |
| 2W-PLAR/RD-Idle | Gnd | Batt | Open | Open | Open | Open |
| 2W-PLAR/RD-Ringing | Gnd | Ringing | Open | Open | Open | Open |
| 2W-PLAR/RD-Busy | Gnd | Batt | Open | Open | Open | Open |
| 4W-FX/RD and PLAR1&2 | Gnd | Batt | Open | Open | Open | Open |
| 4W-PLAR/RD-Idle | Gnd | Batt | Open | Open | Open | Open |
| 4W-PLAR/RD-Ringing | Gnd | Ringing | Open | Open | Open | Open |
| 4W-PLAR/RD-Busy | Gnd | Batt | Open | Open | Open | Open |
| 2W-LSFXS-Idle | Gnd | Batt | Open | Open | Open | Open |
| 2W-LSFXS-Ringing | Gnd | Ringing | Open | Open | Open | Open |
| 2W-LSFXS-Busy | Gnd | Batt | Open | Open | Open | Open |
| 4W-LSFXS-Idle | Gnd | Batt | Open | Open | Open | Open |
| 4W-LSFXS-Ringing | Gnd | Ringing | Open | Open | Open | Open |
| 4W-LSFXS-Busy | Gnd | Batt | Open | Open | Open | Open |
| 2W-GSFXS-Idle | Open | Batt | Open | Open | Open | Open |
| 2W-GSFXS-Tip Gnd | Gnd | Batt | Open | Open | Open | Open |
| 2W-GSFXS-Ringing | Gnd | Ringing | Open | Open | Open | Open |
| 2W-GSFXS-Busy | Gnd | Batt | Open | Open | Open | Open |
| 4W-GSFXS-Idle | Open | Batt | Open | Open | Open | Open |
| 4W-GSFXS-Tip Gnd | Gnd | Batt | Open | Open | Open | Open |
| 4W-GSFXS-Ringing | Gnd | Ringing | Open | Open | Open | Open |
| 4W-GSFXS-Busy | Gnd | Batt | Open | Open | Open | Open |
| 2W-LSFXO-Idle | Open | Open | Open | Open | Open | Open |
| 2W-LSFXO-R Det | Open | Open | Open | Open | Open | Open |

TABLE II-continued

Signaling Lead Connections versus Mode and State

| | A Lead | B Lead | E Lead | M Lead | SB Lead | SG Lead |
|---|---|---|---|---|---|---|
| 2W-LSFXO-Busy | *Loop | *Loop | Open | Open | Open | Open |
| 2W-GSFXO-Idle | Batt | Open | Open | Open | Open | Open |
| 2W-GSFXO-RngGnd | Batt | Gnd | Open | Open | Open | Open |
| 2W-GSFXO-Ring Det | Batt | Gnd | Open | Open | Open | Open |
| 2W-GSFXO-Busy | *Loop | *Loop | Open | Open | Open | Open |
| 4W-LSFXO-Idle | Open | Open | Open | Open | Open | Open |
| 4W-LSFXO-R Det | Open | Open | Open | Open | Open | Open |
| 4W-LSFXO-Busy | *Loop | *Loop | Open | Open | Open | Open |
| 4W-GSFXO-Idle | Batt | Open | Open | Open | Open | Open |
| 4W-GSFXO-RngGnd | Batt | Gnd | Open | Open | Open | Open |
| 4W-GSFXO-Ring Det | Batt | Gnd | Open | Open | Open | Open |
| 4W-GSFXO-Busy | *Loop | *Loop | Open | Open | Open | Open |
| 2W-Disconnect (Safe) | Open | Open | Open | Open | Open | Open |
| 4W-Disconnect (Safe) | Open | Open | Open | Open | Open | Open |
| 2W-DXN-Idle | *Gnd | DXV | Open | Open | Open | Open |
| 2W-DXN-Busy | *Batt | DXV | Open | Open | Open | Open |
| 2W-DXR-Idle | DXV | *Gnd | Open | Open | Open | Open |
| 2W-DXR-Busy | DXV | *Batt | Open | Open | Open | Open |
| 4W-DXN-Idle | *Gnd | DXV | Open | Open | Open | Open |
| 4W-DXN-Busy | *Batt | DXV | Open | Open | Open | Open |
| 4W-DXR-Idle | DXV | *Gnd | Open | Open | Open | Open |
| 4W-DXR-Busy | DXV | *Batt | Open | Open | Open | Open |
| 2W-DPO-Ra = 0 | Gnd (N) | Batt (N) | Open | Open | Open | Open |
| 2W-DPO-Ra = 1 | Batt (R) | Gnd (R) | Open | Open | Open | Open |
| 2W-DPT-Ra = 0 | Open | Open | Open | Open | Open | Open |
| 2W-DPT-Ra = 1 | *Loop | *Loop | Open | Open | Open | Open |
| A Channel | | | | | | |
| TDM Options E, S or T, R or V | | | | | | |
| TDM: opt. Z; Ra = 0 | Open | Open | *Open | BSense | Gnd | Gnd |
| TDM: opt. Z; Ra = 1 | Open | Open | *Gnd | BSense | Gnd | Gnd |
| B Channel | | | | | | |
| TDM Options S or T, R or V | | | | | | |
| TDM: opt. W; Rb = 1 | Open | Open | — | Bsense | Gnd | — |
| TDM: opt. W; Rb = 0 | SG | Open | — | BSense | Gnd | — |
| 2WTO/2WETO/GT | Open | Open | Open | Open | Open | Open |
| 4WTO/4WETO/SF | Open | Open | Open | Open | Open | Open |
| 4W-Sealing Current-norm | Gnd | Batt | Open | Open | Open | Open |
| 4W-Sealing Current-ZAP | Gnd | Batt | Open | Open | Open | Open |
| 4W-Sealing Current-Sink | Loop | Loop | Open | Open | Open | Open |
| E&M and PLR Modes | | | | | | |
| 2W-Disconnect (Safe) | Open | Open | Open | Open | Open | Open |
| 4W-Disconnect (Safe) | Open | Open | Open | Open | Open | Open |
| 2W-PLR1-ONH | Open | Open | BSense | *Gnd | Open | Open |
| 2W-PLR1-OFH | Open | Open | BSense | *Batt | Open | Open |
| 4W-PLR1-ONH | Open | Open | BSense | *Gnd | Open | Open |
| 4W-PLR1-OFH | Open | Open | BSense | *Batt | Open | Open |
| 2W-E&M1-ONH | Open | Open | *Open | GSense | Open | Open |
| 2W-E&M1-OFH | Open | Open | *Gnd | GSense | Open | Open |
| 4W-E&M1-ONH | Open | Open | *Open | GSense | Open | Open |
| 4W-E&M1-OFH | Open | Open | *Gnd | GSense | Open | Open |
| 2W-PLR2-ONH | Open | Open | BSense | *Open | *Open | Gnd |
| 2W-PLR2-OFH | Open | Open | BSense | *SB | *M | Gnd |
| 4W-PLR2-ONH | Open | Open | BSense | *Open | *Open | Gnd |
| 4W-PLR2-OFH | Open | Open | BSense | *SB | *M | Gnd |
| 2W-E&M2-ONH | Open | Open | *Open | GSense | Batt-CL | *Open |
| 2W-E&M2-OFH | Open | Open | *SG | GSense | Batt-CL | *E |
| 4W-E&M2-ONH | Open | Open | *Open | GSense | Batt-CL | *Open |
| 4W-E&M2-OFH | Open | Open | *SG | GSense | Batt-CL | *E |
| 2W-PLR3-ONH | Open | Open | BSense | *SG | *Open | *E |
| 2W-PLR3-OFH | Open | Open | BSense | *SB | *M | *Open |
| 4W-PLR3-ONH | Open | Open | BSense | *SG | *Open | *E |
| 4W-PLR3-OFH | Open | Open | BSense | *SB | *M | *Open |
| 2W-E&M3-ONH | Open | Open | *Open | GSense | Batt-CL | Gnd |
| 2W-E&M3-OFH | Open | Open | *SG | GSense | Batt-CL | Gnd |
| 4W-E&M3-ONH | Open | Open | *Open | GSense | Batt-CL | Gnd |
| 4W-E&M3-OFH | Open | Open | *SG | GSense | Batt-CL | Gnd |

Where
*indicates Dial Pulsing Contact
DXV = 19.6 vdc for DX Signaling
(N) = Normal Battery
(R) = Reverse Battery
BSense = Battery Connected Sense
GSense = Ground Connected Sense
BattCL = Battery Current Limiter

TABLE III (part 1)

Universal Signaling Circuit Control Lines

Loop Modes

| | *Ring Bias | *A-SG | *Rev | Long Dis | Decoder Outputs | | | | Decoder Outputs | | | Hi Gain |
| --- | --- | --- | --- | --- | --- | --- | --- | --- | --- | --- | --- | --- |
| | | | | | *M Gnd Sw | *M Batt Sw | *M-SG Sw | *M-SB Sw | *E Gnd Sw | *E Batt Sw | *E-SG Sw | |
| Reference Number -> | 320 | 304 | 140 | 335 | 313 | 317 | 312 | 311 | 308 | 309 | 306 | 320 |
| 2W-Disconnect (Safe) | 1 | 1 | 1 | 0 | 1 | 1 | 1 | 1 | 1 | 1 | 1 | 1 |
| 4W-Disconnect (Safe) | 1 | 1 | 1 | 0 | 1 | 1 | 1 | 1 | 1 | 1 | 1 | 1 |
| 2W-FX/RD and PLAR1&2 | | | | | | | | | | | | |
| 2W-PLAR/RD-Idle | 1 | 1 | 1 | 0 | 1 | 1 | 1 | 1 | 1 | 1 | 1 | 1 |
| 2W-PLAR/RD-Ringing | 1 | 1 | 1 | 1 | 1 | 1 | 1 | 1 | 1 | 1 | 1 | 1 |
| 2W-PLAR/RD-Busy | 1 | 1 | 1 | 0 | 1 | 1 | 1 | 1 | 1 | 1 | 1 | 1 |
| 4W-FX/RD and PLAR1&2 | | | | | | | | | | | | |
| 4W-PLAR/RD-Idle | 1 | 1 | 1 | 0 | 1 | 1 | 1 | 1 | 1 | 1 | 1 | 1 |
| 4W-PLAR/RD-Ringing | 1 | 1 | 1 | 1 | 1 | 1 | 1 | 1 | 1 | 1 | 1 | 1 |
| 4W-PLAR/RD-Busy | 1 | 1 | 1 | 0 | 1 | 1 | 1 | 1 | 1 | 1 | 1 | 1 |
| 2W-LSFXS-Idle | 1 | 1 | 1 | 0 | 1 | 1 | 1 | 1 | 1 | 1 | 1 | 1 |
| 2W-LSFXS-Ringing | 1 | 1 | 1 | 1 | 1 | 1 | 1 | 1 | 1 | 1 | 1 | 1 |
| 2W-LSFXS-Busy | 1 | 1 | 1 | 0 | 1 | 1 | 1 | 1 | 1 | 1 | 1 | 1 |
| 4W-LSFXS-Idle | 1 | 1 | 1 | 0 | 1 | 1 | 1 | 1 | 1 | 1 | 1 | 1 |
| 4W-LSFXS-Ringing | 1 | 1 | 1 | 1 | 1 | 1 | 1 | 1 | 1 | 1 | 1 | 1 |
| 4W-LSFXS-Busy | 1 | 1 | 1 | 0 | 1 | 1 | 1 | 1 | 1 | 1 | 1 | 1 |
| 2W-GSFXS-Idle | 1 | 1 | 1 | 0 | 1 | 1 | 1 | 1 | 1 | 1 | 1 | 1 |
| 2W-GSFXS-Tip Gnd | 1 | 1 | 1 | 0 | 1 | 1 | 1 | 1 | 1 | 1 | 1 | 1 |
| 2W-GSFXS-Ringing | 1 | 1 | 1 | 1 | 1 | 1 | 1 | 1 | 1 | 1 | 1 | 1 |
| 2W-GSFXS-Busy | 1 | 1 | 1 | 0 | 1 | 1 | 1 | 1 | 1 | 1 | 1 | 1 |
| 4W-GSFXS-Idle | 1 | 1 | 1 | 0 | 1 | 1 | 1 | 1 | 1 | 1 | 1 | 1 |
| 4W-GSFXS-Tip Gnd | 1 | 1 | 1 | 0 | 1 | 1 | 1 | 1 | 1 | 1 | 1 | 1 |
| 4W-GSFXS-Ringing | 1 | 1 | 1 | 1 | 1 | 1 | 1 | 1 | 1 | 1 | 1 | 1 |
| 4W-GSFXS-Busy | 1 | 1 | 1 | 0 | 1 | 1 | 1 | 1 | 1 | 1 | 1 | 1 |

TABLE III (part 2)

Universal Signaling Circuit Control Lines

Loop Modes

| | Volt | *Mdet | *SBBatt | SGGnd | *SB Gnd SW | *23 ma | *50 ma | Decoder Outputs | | | | | |
| --- | --- | --- | --- | --- | --- | --- | --- | --- | --- | --- | --- | --- | --- |
| | | | | | | | | *Loop | *A Gnd Sw | *A Batt Sw | *B Gnd Sw | *B Batt Sw | *Bring Sw |
| Reference Number -> | 320 | 315 | 310 | 307 | 319 | 335 | 335 | 323 | 322 | 326 | 327 | 334 | 329 |
| 2W-Disconnect (Safe) | 0 | 1 | 1 | 0 | 1 | 1 | 1 | 1 | 1 | 1 | 1 | 1 | 1 |
| 4W-Disconnect (Safe) | 0 | 1 | 1 | 0 | 1 | 1 | 1 | 1 | 1 | 1 | 1 | 1 | 1 |
| 2W-FX/RD and PLAR1&2 | | | | | | | | | | | | | |
| 2W-PLAR/RD-Idle | 0 | 1 | 1 | 0 | 1 | 1 | 0 | 1 | 0 | 1 | 1 | 0 | 1 |
| 2W-PLAR/RD-Ringing | 0 | 1 | 1 | 0 | 1 | 1 | 0 | 1 | 0 | 1 | 1 | 0 | 0 |
| 2W-PLAR/RD-Busy | 0 | 1 | 1 | 0 | 1 | 1 | 0 | 1 | 0 | 1 | 1 | 0 | 1 |
| 4W-FX/RD and PLAR1&2 | | | | | | | | | | | | | |
| 4W-PLAR/RD-Idle | 0 | 1 | 1 | 0 | 1 | 1 | 0 | 1 | 0 | 1 | 1 | 0 | 1 |
| 4W-PLAR/RD-Ringing | 0 | 1 | 1 | 0 | 1 | 1 | 0 | 1 | 0 | 1 | 1 | 0 | 0 |
| 4W-PLAR/RD-Busy | 0 | 1 | 1 | 0 | 1 | 1 | 0 | 1 | 0 | 1 | 1 | 0 | 1 |
| 2W-LSFXS-Idle | 0 | 1 | 1 | 0 | 1 | 1 | 0 | 1 | 0 | 1 | 1 | 0 | 1 |
| 2W-LSFXS-Ringing | 0 | 1 | 1 | 0 | 1 | 1 | 0 | 1 | 0 | 1 | 1 | 0 | 0 |
| 2W-LSFXS-Busy | 0 | 1 | 1 | 0 | 1 | 1 | 0 | 1 | 0 | 1 | 1 | 0 | 1 |
| 4W-LSFXS-Idle | 0 | 1 | 1 | 0 | 1 | 1 | 0 | 1 | 0 | 1 | 1 | 0 | 1 |
| 4W-LSFXS-Ringing | 0 | 1 | 1 | 0 | 1 | 1 | 0 | 1 | 0 | 1 | 1 | 0 | 0 |
| 4W-LSFXS-Busy | 0 | 1 | 1 | 0 | 1 | 1 | 0 | 1 | 0 | 1 | 1 | 0 | 1 |
| 2W-GSFXS-Idle | 0 | 1 | 1 | 0 | 1 | 1 | 0 | 1 | 0 | 1 | 1 | 0 | 1 |
| 2W-GSFXS-Tip Gnd | 0 | 1 | 1 | 0 | 1 | 1 | 0 | 1 | 0 | 1 | 1 | 1 | 1 |
| 2W-GSFXS-Ringing | 0 | 1 | 1 | 0 | 1 | 1 | 0 | 1 | 0 | 1 | 1 | 1 | 0 |
| 2W-GSFXS-Busy | 0 | 1 | 1 | 0 | 1 | 1 | 0 | 1 | 0 | 1 | 1 | 1 | 1 |
| 4W-GSFXS-Idle | 0 | 1 | 1 | 0 | 1 | 1 | 0 | 1 | 0 | 1 | 1 | 0 | 1 |
| 4W-GSFXS-Tip Gnd | 0 | 1 | 1 | 0 | 1 | 1 | 0 | 1 | 0 | 1 | 1 | 1 | 1 |
| 4W-GSFXS-Ringing | 0 | 1 | 1 | 0 | 1 | 1 | 0 | 1 | 0 | 1 | 1 | 1 | 0 |
| 4W-GSFXS-Busy | 0 | 1 | 1 | 0 | 1 | 1 | 0 | 1 | 0 | 1 | 1 | 1 | 1 |

TABLE III (part 3)

Universal Signaling Circuit Control Lines
Loop Modes

| | *Ring Bias | *A-SG | *Rev | Long Dis | Decoder Outputs | | | | Decoder Outputs | | | Hi Gain |
|---|---|---|---|---|---|---|---|---|---|---|---|---|
| | | | | | *M Gnd Sw | *M Batt Sw | *M-SG Sw | *M-SB Sw | *E Gnd Sw | *E Batt Sw | *E-SG Sw | |
| Reference Number -> | 320 | 304 | 140 | 335 | 313 | 317 | 312 | 311 | 308 | 309 | 306 | 320 |
| 2W-LSFXO-Idle | 0 | 1 | 1 | 1 | 1 | 1 | 1 | 1 | 1 | 1 | 1 | 0 |
| 2W-LSFXO-R Det | 0 | 1 | 1 | 1 | 1 | 1 | 1 | 1 | 1 | 1 | 1 | 0 |
| 2W-LSFXO-Busy | 1 | 1 | 1 | 1 | 1 | 1 | 1 | 1 | 1 | 1 | 1 | 1 |
| 2W-GSFXO-Idle | 1 | 1 | 1 | 1 | 1 | 1 | 1 | 1 | 1 | 1 | 1 | 0 |
| 2W-GSFXO-RngGnd | 1 | 1 | 1 | 1 | 1 | 1 | 1 | 1 | 1 | 1 | 1 | 0 |
| 2W-GSFXO-Ring Det | 0 | 1 | 1 | 1 | 1 | 1 | 1 | 1 | 1 | 1 | 1 | 0 |
| 2W-GSFXO-Busy | 1 | 1 | 1 | 1 | 1 | 1 | 1 | 1 | 1 | 1 | 1 | 1 |
| 4W-LSFXO-Idle | 0 | 1 | 1 | 1 | 1 | 1 | 1 | 1 | 1 | 1 | 1 | 0 |
| 4W-LSFXO-R Det | 0 | 1 | 1 | 1 | 1 | 1 | 1 | 1 | 1 | 1 | 1 | 0 |
| 4W-LSFXO-Busy | 1 | 1 | 1 | 1 | 1 | 1 | 1 | 1 | 1 | 1 | 1 | 1 |
| 4W-GSFXO-Idle | 1 | 1 | 1 | 1 | 1 | 1 | 1 | 1 | 1 | 1 | 1 | 0 |
| 4W-GSFXO-RngGnd | 1 | 1 | 1 | 1 | 1 | 1 | 1 | 1 | 1 | 1 | 1 | 0 |
| 4W-GSFXO-Ring Det | 0 | 1 | 1 | 1 | 1 | 1 | 1 | 1 | 1 | 1 | 1 | 0 |
| 4W-GSFXO-Busy | 1 | 1 | 1 | 1 | 1 | 1 | 1 | 1 | 1 | 1 | 1 | 1 |
| 2W-DXN-Idle | 1 | 1 | 1 | 1 | 1 | 1 | 1 | 1 | 1 | 1 | 1 | 1 |
| 2W-DXN-Busy | 1 | 1 | 1 | 1 | 1 | 1 | 1 | 1 | 1 | 1 | 1 | 1 |
| 2W-DXR-Idle | 1 | 1 | 0 | 1 | 1 | 1 | 1 | 1 | 1 | 1 | 1 | 1 |
| 2W-DXR-Busy | 1 | 1 | 0 | 1 | 1 | 1 | 1 | 1 | 1 | 1 | 1 | 1 |
| 4W-DXN-Idle | 1 | 1 | 1 | 1 | 1 | 1 | 1 | 1 | 1 | 1 | 1 | 1 |
| 4W-DXN-Busy | 1 | 1 | 1 | 1 | 1 | 1 | 1 | 1 | 1 | 1 | 1 | 1 |
| 4W-DXR-Idle | 1 | 1 | 0 | 1 | 1 | 1 | 1 | 1 | 1 | 1 | 1 | 1 |
| 4W-DXR-Busy | 1 | 1 | 0 | 1 | 1 | 1 | 1 | 1 | 1 | 1 | 1 | 1 |
| 2W-DPO-Ra = 0 | 1 | 1 | 1 | 0 | 1 | 1 | 1 | 1 | 1 | 1 | 1 | 1 |
| 2W-DPO-Ra = 1 | 1 | 1 | 0 | 0 | 1 | 1 | 1 | 1 | 1 | 1 | 1 | 1 |

TABLE III (part 4)

Universal Signaling Circuit Control Lines
Loop Modes

| | Volt | *Mdet | *SBBatt | SGGnd | *SB Gnd SW | *23 ma | *50 ma | *Loop | Decoder Outputs | | | | |
|---|---|---|---|---|---|---|---|---|---|---|---|---|---|
| | | | | | | | | | *A Gnd Sw | *A Batt Sw | *B Gnd Sw | *B Batt Sw | *Bring Sw |
| Reference Number -> | 320 | 315 | 310 | 307 | 319 | 335 | 335 | 323 | 322 | 326 | 327 | 334 | 329 |
| 2W-LSFXO-Idle | 1 | 1 | 1 | 0 | 1 | 1 | 1 | 1 | 1 | 1 | 1 | 1 | 1 |
| 2W-LSFXO-R Det | 1 | 1 | 1 | 0 | 1 | 1 | 1 | 1 | 1 | 1 | 1 | 1 | 1 |
| 2W-LSFXO-Busy | 0 | 1 | 1 | 0 | 1 | 1 | 1 | 0 | 1 | 1 | 1 | 1 | 1 |
| 2W-GSFXO-Idle | 1 | 1 | 1 | 0 | 1 | 1 | 1 | 1 | 0 | 1 | 1 | 1 | 1 |
| 2W-GSFXO-RngGnd | 1 | 1 | 1 | 0 | 1 | 1 | 1 | 1 | 0 | 0 | 1 | 1 | 1 |
| 2W-GSFXO-Ring Det | 1 | 1 | 1 | 0 | 1 | 1 | 1 | 1 | 0 | 1 | 1 | 1 | 1 |
| 2W-GSFXO-Busy | 0 | 1 | 1 | 0 | 1 | 1 | 1 | 0 | 0 | 1 | 1 | 1 | 1 |
| 4W-LSFXO-Idle | 1 | 1 | 1 | 0 | 1 | 1 | 1 | 1 | 0 | 1 | 1 | 1 | 1 |
| 4W-LSFXO-R Det | 1 | 1 | 1 | 0 | 1 | 1 | 1 | 1 | 0 | 1 | 1 | 1 | 1 |
| 4W-LSFXO-Busy | 0 | 1 | 1 | 0 | 1 | 1 | 1 | 0 | 0 | 1 | 1 | 1 | 1 |
| 4W-GSFXO-Idle | 1 | 1 | 1 | 0 | 1 | 1 | 1 | 1 | 0 | 1 | 1 | 1 | 1 |
| 4W-GSFXO-RngGnd | 1 | 1 | 1 | 0 | 1 | 1 | 1 | 1 | 0 | 0 | 1 | 1 | 1 |
| 4W-GSFXO-Ring Det | 1 | 1 | 1 | 0 | 1 | 1 | 1 | 1 | 0 | 1 | 1 | 1 | 1 |
| 4W-GSFXO-Busy | 0 | 1 | 1 | 0 | 1 | 1 | 1 | 0 | 0 | 1 | 1 | 1 | 1 |
| 2W-DXN-Idle | 0 | 1 | 1 | 0 | 1 | 1 | 0 | 1 | 0 | 1 | 1 | 1 | 1 |
| 2W-DXN-Busy | 0 | 1 | 1 | 0 | 1 | 1 | 0 | 1 | 1 | 0 | 1 | 1 | 1 |
| 2W-DXR-Idle | 0 | 1 | 1 | 0 | 1 | 1 | 0 | 1 | 0 | 1 | 1 | 1 | 1 |
| 2W-DXR-Busy | 0 | 1 | 1 | 0 | 1 | 1 | 0 | 1 | 1 | 0 | 1 | 1 | 1 |
| 4W-DXN-Idle | 0 | 1 | 1 | 0 | 1 | 1 | 0 | 1 | 0 | 1 | 1 | 1 | 1 |
| 4W-DXN-Busy | 0 | 1 | 1 | 0 | 1 | 1 | 0 | 1 | 1 | 0 | 1 | 1 | 1 |
| 4W-DXR-Idle | 0 | 1 | 1 | 0 | 1 | 1 | 0 | 1 | 0 | 1 | 1 | 1 | 1 |
| 4W-DXR-Busy | 0 | 1 | 1 | 0 | 1 | 1 | 0 | 1 | 1 | 0 | 1 | 1 | 1 |
| 2W-DPO-Ra = 0 | 0 | 1 | 1 | 0 | 1 | 1 | 0 | 1 | 0 | 1 | 1 | 0 | 1 |
| 2W-DPO-Ra = 1 | 0 | 1 | 1 | 0 | 1 | 1 | 0 | 1 | 0 | 1 | 1 | 0 | 1 |

TABLE III (part 5)

Universal Signaling Circuit Control Lines
Loop Modes

| | *Ring Bias | *A-SG | *Rev | Long Dis | Decoder Outputs | | | | Decoder Outputs | | | Hi Gain |
|---|---|---|---|---|---|---|---|---|---|---|---|---|
| | | | | | *M Gnd Sw | *M Batt Sw | *M-SG Sw | *M-SB Sw | *E Gnd Sw | *E Batt Sw | *E-SG Sw | |
| Reference Number -> | 320 | 304 | 140 | 335 | 313 | 317 | 312 | 311 | 308 | 309 | 306 | 320 |
| 2W-DPT-Ra = 0 | 1 | 1 | 1 | 0 | 1 | 1 | 1 | 1 | 1 | 1 | 1 | 1 |
| 2W-DPT-Ra = 1 | 1 | 1 | 1 | 0 | 1 | 1 | 1 | 1 | 1 | 1 | 1 | 1 |
| TDM Options E, S or T, R | | | | | | | | | | | | |

TABLE III (part 5)-continued

Universal Signaling Circuit Control Lines

Loop Modes

| | *Ring Bias | *A-SG | *Rev | Long Dis | Decoder Outputs | | | | Decoder Outputs | | | Hi Gain |
|---|---|---|---|---|---|---|---|---|---|---|---|---|
| | | | | | *M Gnd Sw | *M Batt Sw | *M-SG Sw | *M-SB Sw | *E Gnd Sw | *E Batt Sw | *E-SG Sw | |
| or V | | | | | | | | | | | | |
| TDM: opt. Z; Ra = 0 | 1 | 1 | 1 | 0 | 1 | 0 | 1 | 1 | 1 | 1 | 0 | 1 |
| TDM: opt. Z; Ra = 1 | 1 | 1 | 1 | 0 | 1 | 0 | 1 | 1 | 1 | 1 | 0 | 1 |
| TDM: opt. Y; Ra = 1 | 1 | 1 | 1 | 0 | 1 | 0 | 1 | 1 | 1 | 1 | 0 | 1 |
| TDM: opt. Y; Ra = 0 | 1 | 1 | 1 | 0 | 1 | 0 | 1 | 1 | 1 | 1 | 0 | 1 |
| TDM Options S or T, R or V | | | | | | | | | | | | |
| TDM: opt. W; Rb = 1 | 1 | 1 | 1 | 0 | 1 | 0 | 1 | 1 | 1 | 1 | 0 | 1 |
| TDM: opt. W; Rb = 0 | 1 | 0 | 1 | 0 | 1 | 0 | 1 | 1 | 1 | 1 | 0 | 1 |
| 2WTO/2WETO/GT | 1 | 1 | 1 | 0 | 1 | 1 | 1 | 1 | 1 | 1 | 1 | 1 |
| 4WTO/4WETO/SF | 1 | 1 | 1 | 0 | 1 | 1 | 1 | 1 | 1 | 1 | 1 | 1 |
| 4W-Sealing Current-norm | 1 | 1 | 1 | 1 | 1 | 1 | 1 | 1 | 1 | 1 | 1 | 1 |
| 4W-Sealing Current-ZAP | 1 | 1 | 1 | 1 | 1 | 1 | 1 | 1 | 1 | 1 | 1 | 1 |
| 4W-Sealing Current-Sink | 1 | 1 | 1 | 1 | 1 | 1 | 1 | 1 | 1 | 1 | 1 | 1 |
| 2W-PLR1-ONH | 1 | 1 | 1 | 0 | 0 | 1 | 1 | 1 | 1 | 0 | 1 | 1 |
| 2W-PLR1-OFH | 1 | 1 | 1 | 0 | 1 | 0 | 1 | 1 | 1 | 0 | 1 | 1 |
| 4W-PLR1-ONH | 1 | 1 | 1 | 0 | 0 | 1 | 1 | 1 | 1 | 0 | 1 | 1 |
| 4W-PLR1-OFH | 1 | 1 | 1 | 0 | 1 | 0 | 1 | 1 | 1 | 0 | 1 | 1 |
| 2W-E&M1-ONH | 1 | 1 | 1 | 0 | 0 | 1 | 1 | 1 | 1 | 1 | 1 | 1 |
| 2W-E&M1-OFH | 1 | 1 | 1 | 0 | 0 | 1 | 1 | 1 | 0 | 1 | 1 | 1 |
| 4W-E&M1-ONH | 1 | 1 | 1 | 0 | 0 | 1 | 1 | 1 | 1 | 1 | 1 | 1 |
| 4W-E&M1-OFH | 1 | 1 | 1 | 0 | 0 | 1 | 1 | 1 | 0 | 1 | 1 | 1 |

TABLE III (part 6)

Universal Signaling Circuit Control Lines

Loop Modes

| | Volt | *Mdet | *SBBatt | SGGnd | *SB Gnd SW | *23 ma | *50 ma | *Loop | Decoder Outputs | | | | |
|---|---|---|---|---|---|---|---|---|---|---|---|---|---|
| | | | | | | | | | *A Gnd Sw | *A Batt Sw | *B Gnd Sw | *B Batt Sw | *Bring Sw |
| Reference Number -> | 320 | 315 | 310 | 307 | 319 | 335 | 335 | 323 | 322 | 326 | 327 | 334 | 329 |
| 2W-PLR2-ONH | 0 | 0 | 1 | 1 | 1 | 1 | 1 | 1 | 1 | 1 | 1 | 1 | 1 |
| 2W-PLR2-OFH | 0 | 0 | 1 | 1 | 1 | 1 | 1 | 1 | 1 | 1 | 1 | 1 | 1 |
| 4W-PLR2-ONH | 0 | 0 | 1 | 1 | 1 | 1 | 1 | 1 | 1 | 1 | 1 | 1 | 1 |
| 4W-PLR2-OFH | 0 | 0 | 1 | 1 | 1 | 1 | 1 | 1 | 1 | 1 | 1 | 1 | 1 |
| 2W-E&M2-ONH | 0 | 0 | 0 | 0 | 1 | 1 | 1 | 1 | 1 | 1 | 1 | 1 | 1 |
| 2W-E&M2-OFH | 0 | 0 | 0 | 0 | 1 | 1 | 1 | 1 | 1 | 1 | 1 | 1 | 1 |
| 4W-E&M2-ONH | 0 | 0 | 0 | 0 | 1 | 1 | 1 | 1 | 1 | 1 | 1 | 1 | 1 |
| 4W-E&M2-OFH | 0 | 0 | 0 | 0 | 1 | 1 | 1 | 1 | 1 | 1 | 1 | 1 | 1 |
| 2W-PLR3-ONH | 0 | 1 | 1 | 0 | 1 | 1 | 1 | 1 | 1 | 1 | 1 | 1 | 1 |
| 2W-PLR3-OFH | 0 | 1 | 1 | 0 | 1 | 1 | 1 | 1 | 1 | 1 | 1 | 1 | 1 |
| 4W-PLR3-ONH | 0 | 1 | 1 | 0 | 1 | 1 | 1 | 1 | 1 | 1 | 1 | 1 | 1 |
| 4W-PLR3-OFH | 0 | 1 | 1 | 0 | 1 | 1 | 1 | 1 | 1 | 1 | 1 | 1 | 1 |
| 2W-E&M3-ONH | 0 | 0 | 0 | 1 | 1 | 1 | 1 | 1 | 1 | 1 | 1 | 1 | 1 |
| 2W-E&M3-OFH | 0 | 0 | 0 | 1 | 1 | 1 | 1 | 1 | 1 | 1 | 1 | 1 | 1 |
| 4W-E&M3-ONH | 0 | 0 | 0 | 1 | 1 | 1 | 1 | 1 | 1 | 1 | 1 | 1 | 1 |
| 4W-E&M3-OFH | 0 | 0 | 0 | 1 | 1 | 1 | 1 | 1 | 1 | 1 | 1 | 1 | 1 |

Where:
Normal: 1 = On, 0 = Off
*before name means 0 = On, 1 = Off

Under the teachings of the present invention, the universal signaling circuit 180 can be configured to accomplish each of the signaling lead connections set forth in Table II. Table II is exemplary of a preferred mode and it is to be expressly understood that the present invention is not limited to the modes and/or states therein described.

Two examples will illustrate the operation of Table II.

Example I

Example I is a 2 wire-loop start FXS (2W-LSFXS). As shown, three states exist: idle, ringing, and busy. In all three states the A lead remains at ground and the E, M, SB and SG leads are open (i.e., only the loop circuits 210) are involved. The B lead operates to provide battery feed or ringing during the ringing state.

Example II

Example 2 is a 2W-E&M2 having two states: on hook (ONH) and off hook (OFH). Here the A and B leads are open. The M lead is in ground connected sense (GSense). The SB lead is connected to the battery current limiter. The E and SG leads are initially open on on-hook and close together for the off-hook state.

It can be seen that the universal signaling circuit of the present invention can be configured to function as a 2W-LSFXS signaling circuit by the microprocessor 190. In that configuration, the microprocessor 190 is able to sequence the 2W-LSFXS signaling circuit through its three conventional states. Should it be desired, at a later date, to reconfigure the universal signaling circuit to function as a 2W-E&M2 signaling circuit, the microprocessor 190 can be suitably reprogrammed by portable system controller 120 or remote system controller 100.

It is to be expressly understood that FIG. 2 and Table II represent a preferred embodiment and that under the teachings of the present invention, changes and modifications to signaling lead connections can be made and incorporated into the universal signal circuit 180 of the present invention without departing from the spirit of this invention.

It is to be further expressly understood that the implementation of the signaling lead connections of Table II as implemented in the universal signaling circuit of FIG. 2 is topologically independent of an actual circuit. Many conventional telephony circuits are available for providing voltage and current sensing, battery feed, DX source, and battery limit. However, what follows is a preferred embodiment of one topological circuit approach.

Figure 3A:
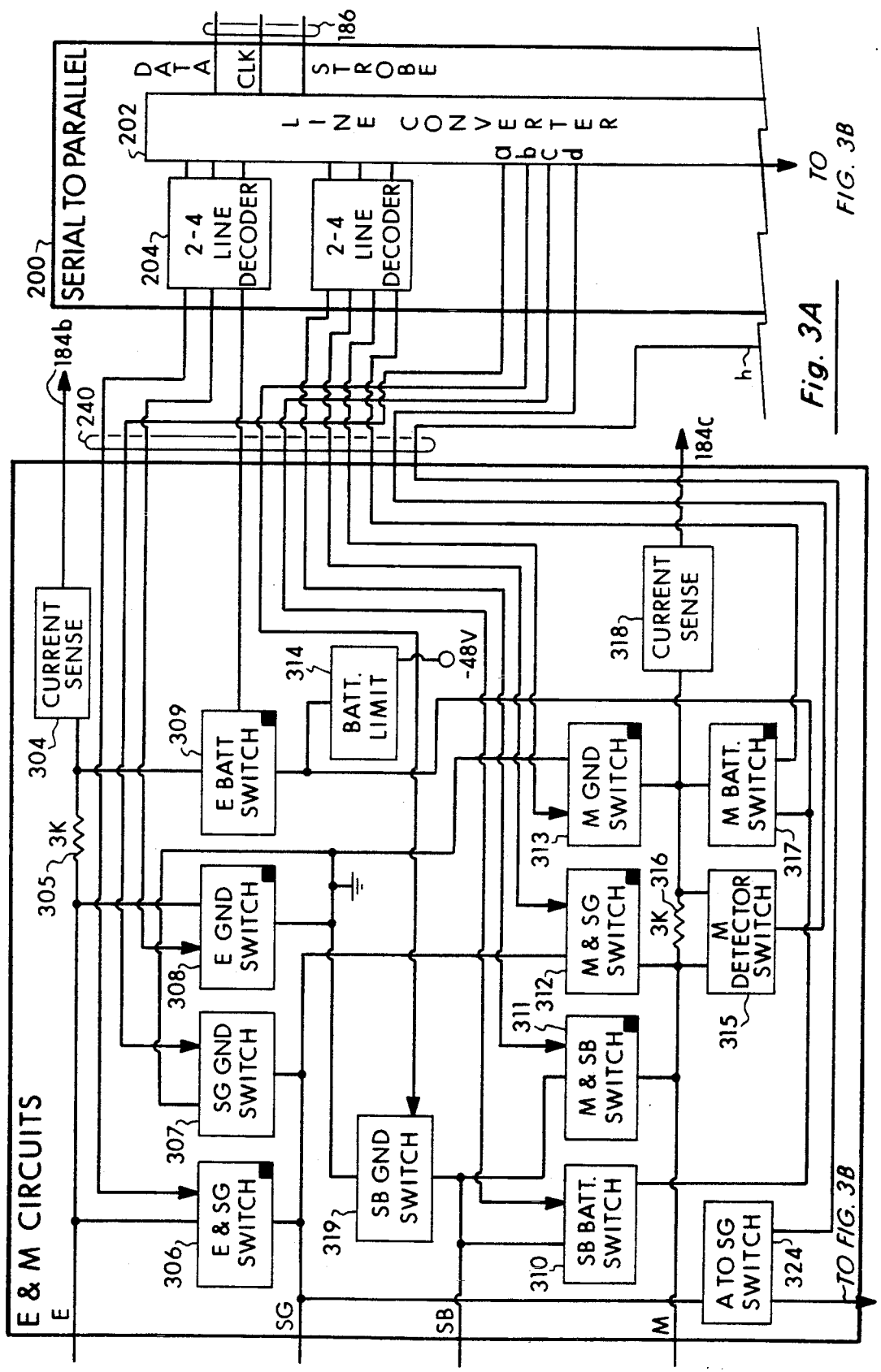
FIGS. 3A and 3B are the detailed diagrams of the Universal Signaling Circuit of the present invention.
Figure 3B:
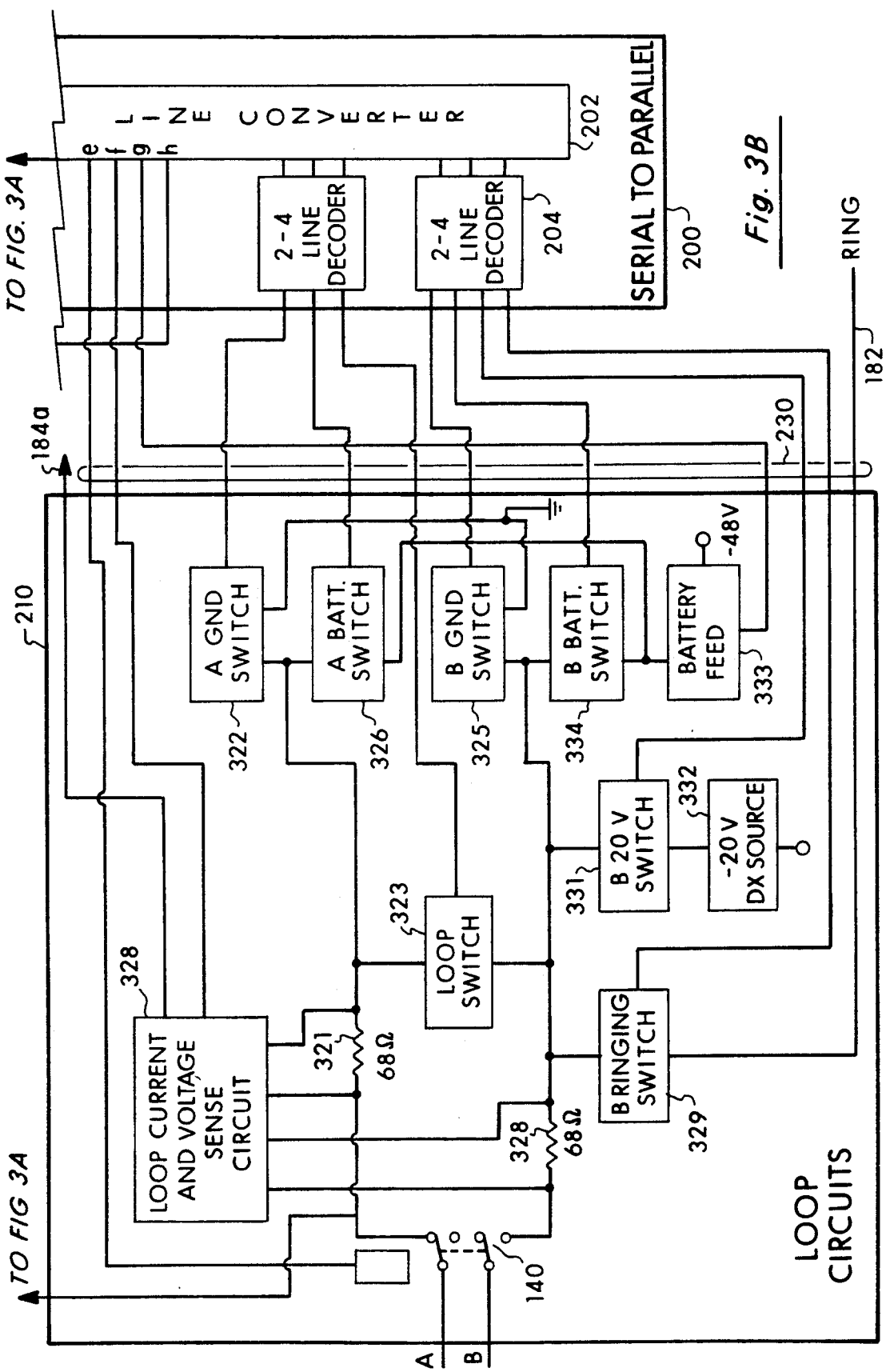

In FIGS. 3A and 3B, the details of the preferred topological embodiment for the universal signaling circuit 180 shown in FIG. 2 is set forth.

a. Serial to Parallel Convert and Decode Circuit 200

The serial to parallel convert and decode circuit 200 is shown to comprise a line converter 202 and four decoders 204. In the preferred embodiment, the line converter is preferably a three to twenty-four line converter using a Model CD4094-type shift register. Each decoder 204 is a two to four line decoder.

The two portions of configuration signals from the serial to parallel convert and decode circuit 200 include lines 240 to the E & M circuits 220 and lines 230 to the loop circuits 210. In both the E & M circuits 220 and the loop circuits 210, those items controlled by the decoders 204 have small black rectangular indicators located in the lower right hand corner of the item. All other items are controlled by the line converter 202 directly. As will be explained, data is delivered into the line converter 202 and based upon that data, the line converter and the decoders 204 configure the loop circuits 210 and the E & M circuits 220 to provide the desired specific output signals as set forth in Table II.

In FIGS. 3A and 3B, the serial to parallel conversion 200 operates as follows. The line converter 202 is serially loaded from the microprocessor 190 over the DATA lead on bus 186. The CLOCK lead shifts the data into the converter 202. When the line converter 202 is fully loaded with the line of data, the microprocessor 190 issues a strobe pulse on the STROBE lead which transfers the new data to the output latches of the line converter 202 in parallel format. The serial to parallel conversion is then performed.

It is to be expressly understood that, under the teachings of the present invention, the line of data delivered into the serial to parallel converter circuit 200 then configures the remaining loop and E&M circuits 210 and 220 to function in one mode of operation. The various states within a configured mode are then selectively entered.

The decoders 204 are utilized so that certain sets of switches cannot be turned on at the same time. For instance, the A battery switch 326 and the A ground switch 322 must never be turned on simultaneously since to do so would short the battery to ground through the two switches. Similarly, the ringing voltage on line 182 must not be applied to the B lead when either ground or signaling battery are applied. Additionally, the E & M switches required 90 volt capability whereas the A and B switches require 250 volt capability.

b. Loop Circuits 210

A discussion of the preferred design for the loop circuits 210 follows.

The loop current and voltage sense circuit 320 is connected across resistors 321 and 328 (which are preferably each 68 ohm resistors but which could vary according to design selection). The loop current and voltage sense circuit 320 measures the voltage at each of the two resistors in order to detect ringing voltage, to detect presence or absence of loop current and to detect the presence or absence of circuit ground or battery potentials.

The loop current and voltage sense circuit 320 is controlled by the data on 186 from the microprocessor 190 which can switch circuit 320 between either voltage or current sensing and can also select one of two sensitivities. This occurs over lead f from the line converter circuit 202 which constitutes two leads (i.e., volt-/current select and Hi/Lo gain select). Under this application, the circuit 320 has the ability to sense either voltages or currents in signaling line A or B. The output of circuit 320 is delivered over line 184a to the microprocessor 190 so that the microprocessor 190 can detect line conditions such as application of battery, ground or ringing to signaling leads A or B.

In operation, loop current typically flows out of the Tip or A lead which is at ground, through the loop and back into the Ring or B lead which is connected to the battery. The circuit 320 is designed to sense loop currents while rejecting any longitudinal currents. Longitudinal currents are caused by interference from sixty Hertz power lines, and flow into or out of the Tip and Ring leads in phase with each other. Under the teachings of the present invention, during the positive half cycle of the interfering voltage, current would flow into both the Tip and Ring leads, then during the negative half cycle, current would flow out of both the tip and ring leads. The loop sensor 320 of the present invention also senses DC loop current flow in either the normal or reversed direction while not sensing the longitudinal current caused by AC power lines.

c. The E & M Circuits

The E & M circuits 220 set forth an arrangement of signaling switches and sensors associated with conventional telephony E & M signaling modes. The E & M switches are used for E & M signaling modes 1 through 5.

The M current sensor 318 is connected to the 3K ohm resistor 316 and senses current flow in the M lead. The E current sensor 308 similarly functions to sense current flow in the E lead. An output transistor, not shown, then turns on and pulls the output to ground.

The E to SG switch 306 is activated by decoder 240 and connects the E and SG signaling paths together. The SG ground switch 307 when activated over line a from converter 202 and connects the SG signaling path to ground. The E ground switch 308 when activated by the decoder 204, connects the E signaling path to ground. The E battery switch 309 when activated by the decoder 204 connects the minus 48 volt battery limiter 314 to the E signaling path to function as mentioned above. The SB ground switch 319 when activated by lead b of the line converter 202 connects battery 314 to signaling path SB. The SB battery switch 310 is activated by line c of the converter 202 and connects the SB signaling path to battery.

The M to SB switch 311 is activated by the decoder 204 to connect the M and SB signaling paths together. The M to SG switch 312 is activated by the decoder to connect the M and SG signaling paths together. The M ground switch 313 is activated by the decoders to connect the M signaling path to ground. The M detector switch 315 is activated by line d of converter 202. The M battery switch 317 is activated by decoder 204 to selectively connect the battery 314 to the signaling path M when the current 315 is being sensed. The A to SG switch which is controlled by line h of the converter 202 interconnects the A and SG signaling paths together for tandem signaling mode (TDM).

d. Configuration signals

In Table III below, the sets of configuration signals of the present invention are set forth. These are the signals delivered over lines 230 and 240 from the serial to parallel converter 200 which according to the diagram of FIGS. 3A and 3B, controls the loop and E & M circuits 210 and 220.

Example I

Figure 4:
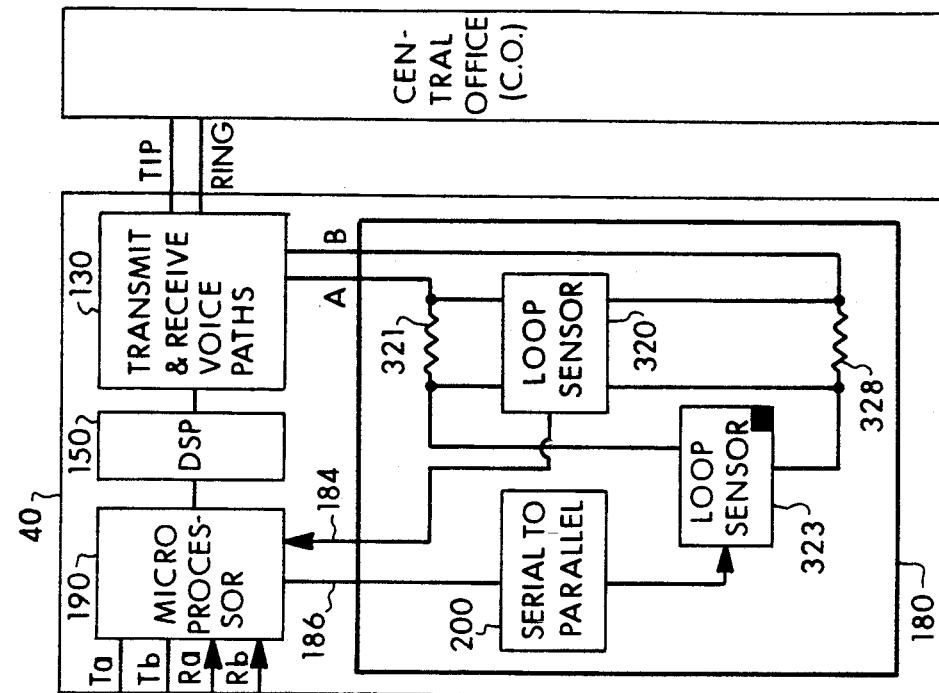
FIG. 4 is a schematic illustrating the two wire loop start FX (2W-LSFXS and 2W-LSFXO) modes of operation of the present invention.
Figure 4:
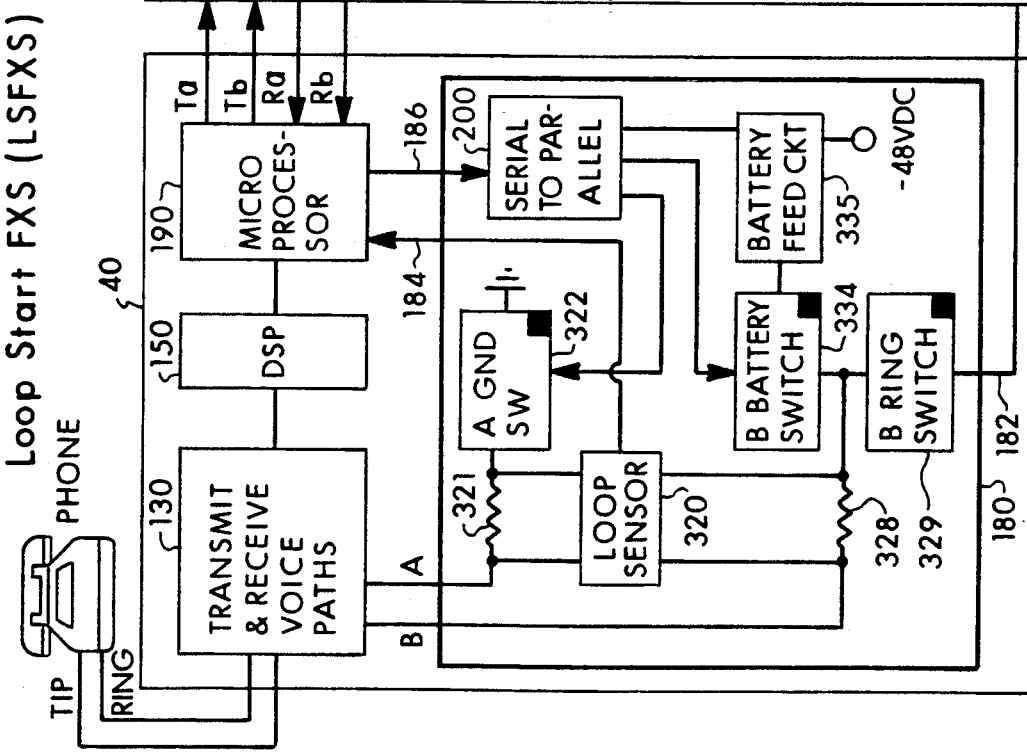

In FIG. 4, the configured signaling circuit of Example I (i.e., 2W-LSFXS) is set forth. FIG. 4 also illustrates the configuring of the loop circuit 210 for a 2W-LSFXO. This example illustrates on the phone side of the telephone network a loop start FXS and on the central office side a loop start FXO modes of operation.

In FIG. 4, the universal signaling circuit 180 on the phone side is configured as a 2W-LSFXS signaling circuit as shown. The B ring switch 329 is configured to connect the battery feed circuit 335 through resistor 328 to the A signaling path. The loop sensor is configured to be across resistors 321 and 328 on both the A and B signaling paths. The A ground switch 322 is activated to connect the A signaling path to ground. This is fully set forth in Table III where:

Volt (loop sensor) 320=0
  (i.e., 0=sensor in Current Sense Mode)
50 ma (Batt. Feed Ckt.) 335=0
  (i.e., 0=ON)
A Gnd Sw 322=0
  (i.e., 0=ON)
B Batt Sw 334=0
  (i.e., 0=ON)
B Ring Sw 329=0 or 1
  (depending on state)

In this 2W-LSFXS mode of operation, the microprocessor 190 has delivered data to the serial to parallel convert and decode circuit 200 which then delivers a set of configuration signals as set forth above, to configure the circuit as described. In reference to Table II and as discussed above, for the mode of 2W-LSFXS, there are three states: idle, ringing, and busy. In this configuration, the E & M circuits are not configured (i.e., they are left open). However, the A lead is left at ground and the B lead is at battery during the idle state, ringing during the ring state, and again at battery during the busy state. Hence, as the microprocessor cycles through the three states, the following occurs as fully set forth in Table III.

First, the microprocessor 190 requires the circuit 180 to deliver ringing to the phone. Data is delivered to the converter 200 which causes the B ring switch 329 to close to line 182 to deliver a ringing signal to the phone. In Table III, B-ring SW 329 is set forth as Idle=1, Ringing=0, Busy=1. When the phone goes off the hook, the loop sensor 320 senses this signal and delivers an off-hook signal back to the microprocessor over 184. During ringing, the battery feed circuit 335 changes to the 1 state (i.e., table III, Long. Dis 335) under control of the serial to parallel converter 200. This disables the longitudinal balance ("Long Dis") during ringing thereby providing a fixed battery feed potential. The microprocessor turns off the B-ring switch 329 by sending new data to the converter 200 and the phone is now in the busy state.

At the central office side of the telephone network, the universal signaling circuit 180 is configured in the 2W-LSFXO mode of operation. Hence, with reference to Table II, three states exist for this mode of operation: idle, ring detect, and busy. In the idle mode of operation, the loop switch 323 is open and a ringing command is sent by microprocessor 190. Table III sets forth the configuration values of:

In essence, this example illustrates the configuration of the universal signaling circuit of the present invention on the phone side into the FXS mode so that the universal signaling circuit acts like a central office to the telephone by detecting the off-hook, providing battery feed, and providing ringing. On the other hand, the universal signaling circuit of the present invention on the central office side is configured as an FXO so that the universal signaling circuit acts like a telephone to the central office by closing the loop switch and by detecting ringing from the central office. Here, and with reference to Table III, the following states exist:

|  | Idle | R. Det. | Busy |
|---|---|---|---|
| Ring Bias (loop sensor) 320 | 0 | 0 | 1 |
| Hi Gain (loop sensor) 320 | 0 | 0 | 1 |
| Volt (loop sensor) 320 | 1 | 1 | 0 |
| Loop SW 323 | 1 | 1 | 0 |

The first three entries control the operation of the loop sensor 320 and the last controls the operation of switch 323.

Example II

In this example, two configurations for the E & M circuits 220 are set forth. On the central office number one side, a 2W-E&M2 interface circuit is configured corresponding to Example II above. In the central office number two side, a PLR2 interface is configured in the universal signaling circuit of the present invention. This illustrates two E & M trunk applications.

Figure 5:
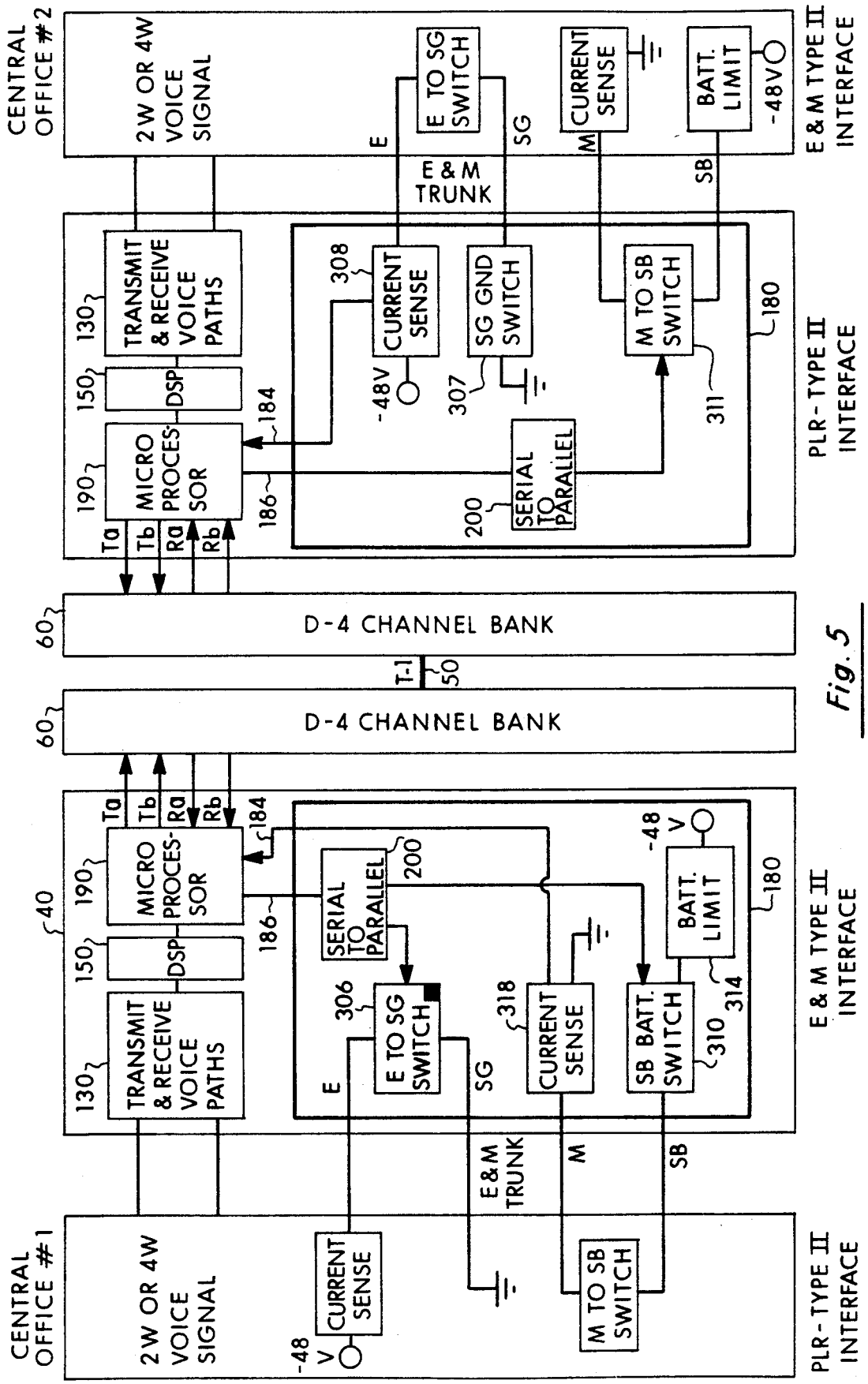
FIG. 5 is a schematic illustrating the two wire E & M Type II and PLR-Type II modes of operation of the present invention.

In reference to Table II, the 2W-E&M2 mode has two states: on-hook and off-hook. As shown in Table II, the A and B leads are not involved and therefore are left open. The universal signaling circuit is configured around the E & M loop circuits. As shown in FIG. 5, this configuration the E to SG switch 306, the current sense 318, and the SB battery switch 310 are configured. Table III sets forth the following logical states for the E & M type II Interface:

|  | ONH | OFH |
|---|---|---|
| E-SG Sw 306 | 1 | 0 |

| | ONH | OFH |
|---|---|---|
| SB Batt 310 | 0 | 0 |

In operation, central office number one closes its M to SB switch. The M current sensor 318 in the E & M Type II Interface senses this closure and sends a signal over line 184 to microprocessor 190. The microprocessor 190 sends a signal through the D-4 Channel Bank 60, over the T1 carrier 50, through the D-4 Channel Bank 60 to microprocessor 190 in the PLR Type II interface. That micropocessor sends data to the serial to parallel converter circuit 200 over line 186 which causes the universal signaling circuit 180 for the PLR Type II Interface to close the M to SB switch 311 which is detected by the M current sense circuit at central office number two.

Hence, in this operation, the universal signaling circuit 180 located at central office number one is configured as an E & M type two interface. The SB battery switch 310 is activated by the converter 200 to deliver minus 48 volts from the battery 314 over the SB signaling path to the M to SB switch in the central office number one. This enables the M current sensor 318 to sense current for delivery to the microprocessor 190 (E & M Type II Interface). At central office number two, the universal signaling circuit 180 closes the M to SB switch 311 thereby replicating this signal in central office number two. Likewise, central office number two can activate its E to SG switch wherein the current sensor 308 in the universal signaling circuit 180 at the PLR—Type II Interface sends a signal to the microprocessor 190 over line 184. Microprocessor 190 in the universal channel unit for the PLR—Type II Interface communicates this information to the microprocessor 190 in the universal channel unit 40 for the first central office which causes the serial to parallel convert circuit there to activate the E to SG switch 306 causing the central office number one to sense the current flow.

It is to be expressly understood that the claimed invention is not to be limited to the description of the preferred embodiment but encompasses other modifications and alterations within the scope and spirit of the inventive concept.

I claim:

1. A programmable universal signaling circuit (180) for use in a universal channel unit (40) of a telephone network; said universal channel unit having: A, B, E, M SB, and SG telephone network signaling paths, a microprocessor (190) and a PCM interface (170); said PCM interface being connected to a PCM bus (50), said programmable universal signaling circuit comprising:

means (200) connected to said microprocessor and receptive of data from said microprocessor for generating a unique set of configuration signals corresponding to said received data, said generating means further generating a plurality of different sets of configuration signals corresponding to a plurality of different data received from said microprocessor, first means (210) connected to said generating means, to said microprocessor, and to said A and B signaling paths for selectively configuring to function as a preselected one of a number of loop circuits, said first generating means being receptive of a first portion of said unique set of configuration signals to configure into said preselected one of said number of loop circuits so as to provide A and B signals over said A and B signaling paths necessary for said preselected one loop circuit, said first configuring means delivering the sensed loop current value or loop voltage value for said A and B signaling paths to said microprocessor, and second means (220) connected to said generating means, to said microprocessor, and to said E, M, SG, and SB signaling paths for selectively configuring to function as a preselected one of a number of E & M circuits, said second configuring means being receptive of a second portion of said unique set of configuration signals to configure into said preselected one of said number of E & M circuits so as to provide E, M, SB, and SG signals over said E, M, SB and SG signaling paths necessary for said selected one E & M circuit, said second configuring means further delivering the sensed E & M current value or E & M voltage value for said E & M signaling paths to said microprocessor.

2. The programmable universal signaling circuit of claim 1 wherein said generating means comprises:
a line converter (202) connected to said microprocessor to receive said data from said microprocessor,
a decoder (204) connected to the outputs of said line converter for decoding a predetermined number of said outputs of said line converter, and
said unique set of configuration signals being generated from the outputs of said decoder.

3. The programmable universal signaling circuit of claim 1 wherein said first configuring means comprises:
means (320) connected to said generating means, to said microprocessor and to said A and B signaling paths for sensing said loop current or loop voltage for said A and B signaling paths, said sensing means being selectively activated by said first portion of said unique set of configuration signals from said generating means to deliver said sensed loop current value or loop voltage value to said microprocessor.

4. The programmable universal signaling circuit of claim 1 wherein said first configuring means comprises:
a battery feed circuit (333),
a plurality of switches, each of said switches being selectively activated by said first portion of said unique set of configuration signals from said generating means, said plurality of switches at least comprising:
(a) an A ground switch (322) for selectively connecting said A signaling path to ground,
(b) an A battery switch (326) for selectively connecting said A signaling path to said battery feed circuit,
(c) a B ground switch (325) for selectively connecting said B signaling path to ground,
(d) a B battery switch (334) for selectively connecting said B signaling path to said battery feed circuit,
(e) a loop switch (323) for selectively connecting said A and B signaling paths together,
(f) a B ringing switch (329) for selectively connecting ringing to the B signaling path,
(g) a 20 volt DX source, and
(h) a B 20 volt switch for selectively connecting said 20 volt DX source to said B signaling path.

5. The programmable universal signaling circuit of claim 1 wherein said second configuring means comprises:

means (308) connected to said microprocessor and to said E signaling path for sensing current in said E signaling path, said E current sensing means delivering the value of the said sensed E current to said microprocessor, and means (318) connected to said microprocessor and to said M signaling path for sensing current in said M signaling path, said M current sensing means delivering the value of said sensed M current to said microprocessor.

6. The programmable universal signaling circuit of claim 1 wherein said second configuring means comprises:

a minus 48 volt battery (314), a plurality of switches, each of said switches being collectively activated by said second portion of said unique set of configuration signals from said generating means, said plurality of switches at least comprising:

(a) an E battery switch (309) for selectively connecting said minus 48 volt battery to said E signaling path, (b) an M battery switch (317) for selectively connecting said minus 48 volt battery to said M signaling path, (c) an SB battery switch (310) for selectively connecting said minus 48 volt battery to said SB signaling path, (d) an E to SG switch (306) for selectively connecting said E signaling path to said SG signaling path, (e) an SG ground switch (307) for selectively connecting ground to said SG signaling path, (f) an E ground switch (306) for selectively connecting ground to said E signaling path, (g) an SB ground switch (319) for selectively connecting ground to said SB signaling path, (h) an M to SB switch (311) for selectively connecting said M signaling path to said SB signaling path, (i) an M to SG switch (312) for selectively connecting said M signaling path to said SG signaling path, (j) an M ground switch (313) for selectively connecting ground to said M signaling path, and (k) an M detector switch (315) for selectively connecting said M signaling path to either ground or said minus 48 volt battery directly or through a predetermined resistance.

7. The programmable universal signaling circuit of claim 1 wherein said second configuring means comprises an A to SG switch (304) for selectively connecting said SG signaling path to said A signaling path in response to said second portion of said unique set of configuration signals from said generating means for operation in a tandem mode.

8. A programmable universal signaling circuit (180) for use in a universal channel unit (40) of a telephone network; said universal channel unit having: A, B, E, M, SB, and SG telephone network signaling paths, a microprocessor (190) and a PCM interface (170); said PCM interface being connected to a PCM bus (50), said programmable universal signaling circuit comprising:

means (200) connected to said microprocessor and receptive of data from said microprocessor for generating a unique set of configuration signals corresponding to said received data, said generating means further generating a plurality of different sets of configuration signals corresponding to a plurality of different data received from said microprocessor, said generating means comprising:

(i) a line converter (202) connected to said microprocessor to receive said data from said microprocessor, (ii) a decoder (204) connected to the outputs of said line converter for decoding a predetermined number of said outputs of said line converter, and (iii) a plurality of different sets of configuration signals corresponding to a plurality of different data received from said microprocessor, said unique set of configuration signals being generated from the outputs of said decoder, first means (210) connected to said line converter and said decoder, to said microprocessor, and to said A and B signaling paths for selectively configuring to function as a preselected one of a number of loop circuits, said first configuring means being receptive of a first portion of said unique set of configuration signals to configure into said preselected one of said number of loop circuits so as to provide A and B signals over said A and B signaling paths necessary for said preselected one loop circuit, said first configuring means delivering the sensed loop current value or loop voltage value for said A and B signaling paths to said microprocessor, said first configuring means comprising:

(i) a battery feed circuit (333), (ii) a plurality of switches, each of said switches being selectively activated by said first portion of said unique set of configuration signals, said plurality of switches at least comprising:

(a) an A ground switch (322) for selectively connecting said A signaling path to ground, (b) an A battery switch (326) for selectively connecting said A signaling path to said battery feed circuit, (c) a B ground switch (325) for selectively connecting said B signaling path to ground, (d) a B battery switch (334) for selectively connecting said B signaling path to said battery feed circuit, (e) a loop switch (323) for selectively connecting said A and B signaling paths together, (f) a B ringing switch (329) for selectively connecting ringing to the B signaling path, (g) a 20 volt DX source, and (h) a B 20 volt switch for selectively connecting said 20 volt DX source to said B signaling path, and second means (220) connected to said line converter and said decoder, to said microprocessor, and to said E, M, SG, and SB signaling paths for selectively configuring to function as a preselected one of a number of E & M circuits, said second configuring means being receptive of a second portion of said unique set of configuration signals to configure into said preselected one of said number of E & M circuits so as to provide E, M, SB, and SG signals over said E, M, SB and SG signaling paths necessary for said selected one E & M circuit, said second configuring means delivering the sensed E & M current value or E & M voltage value for said E & M signaling paths to said microprocessor, said second configuring means comprising:

(i) a minus 48 volt battery (314), (ii) a plurality of switches, each of said switches being collectively activated by said second portion of said unique set of configuration signals from said generating means, said plurality of switches at least comprising:
(a) an E battery switch (309) for selectively connecting said minus 48 volt battery to said E signaling path,
(b) an M battery switch (317) for selectively connecting said minus 48 volt battery to said M signaling path,
(c) an SB battery switch (310) for selectively connecting said minus 48 volt battery to said SB signaling path,
(d) an E to SG switch (306) for selectively connecting said E signaling path to said SG signaling path,
(e) an SG ground switch (307) for selectively connecting ground to said SG signaling path,
(f) an E ground switch (308) for selectively connecting ground to said E signaling path,
(g) an SB ground switch (319) for selectively connecting ground to said SB signaling path,
(h) an M to SB switch (311) for selectively connecting said M signaling path to said SB signaling path,
(i) an M to SG switch (312) for selectively connecting said M signaling path to said SG signaling path,
(j) an M ground switch (313) for selectively connecting ground to said M signaling path, and
(k) an M detector switch (315) for selectively connecting said M signaling path to either ground or said minus 48 volt battery directly or through a predetermined resistance.

9. The programmable universal signaling circuit of claim 8 wherein said second configuring means also comprises an A to SG switch (304) for selectively connecting said SG signaling path to said A signaling path in response to said second portion of said unique set of configuration signals for operation in a tandem mode.

10. The programmable universal signaling circuit of claim 8 wherein said first configuring means comprises:
means (320) connected to said line converter and said decoder, to said microprocessor and to said A and B signaling paths for sensing said loop current or loop voltage for said A and B signaling paths, said sensing means being selectively activated by said first portion of said unique set of configuration signals to deliver said sensed loop current value or loop voltage value to said microprocessor.

11. The programmable universal signaling circuit of claim 8 wherein said second configuring means comprises:
means (308) connected to said microprocessor and to said E signaling path for sensing current in said E signaling path, said E current sensing means delivering the value of said sensed E current to said microprocessor, and
means (318) connected to said microprocessor and to said M signaling path for sensing current in said M signaling path, said M current sensing means delivering the value of said sensed M current to said microprocessor.

* * * * *